(12) United States Patent
Opper

(10) Patent No.: US 9,365,955 B2
(45) Date of Patent: Jun. 14, 2016

(54) FIBER COMPOSITION COMPRISING 1,3-GLUCAN AND A METHOD OF PREPARING SAME

(71) Applicant: E I DU PONT DE NEMOURS AND COMPANY, Wilmington, DE (US)

(72) Inventor: Kathleen Opper, Wilmington, DE (US)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 777 days.

(21) Appl. No.: 13/723,759

(22) Filed: Dec. 21, 2012

(65) Prior Publication Data

US 2013/0168895 A1 Jul. 4, 2013

Related U.S. Application Data

(60) Provisional application No. 61/582,189, filed on Dec. 30, 2011.

(51) Int. Cl.
| | |
|---|---|
| *D01F 9/00* | (2006.01) |
| *C08L 5/00* | (2006.01) |
| *D01D 5/06* | (2006.01) |
| *C08B 37/00* | (2006.01) |
| *C08J 3/09* | (2006.01) |

(52) U.S. Cl.
CPC .............. *D01F 9/00* (2013.01); *C08B 37/0009* (2013.01); *C08J 3/096* (2013.01); *C08L 5/00* (2013.01); *D01D 5/06* (2013.01); *C08J 2305/00* (2013.01); *Y02P 20/542* (2015.11)

(58) Field of Classification Search
CPC ........ C08L 5/00; C08B 37/0009; D01D 5/06; D01F 9/00; C08J 3/096; C08J 2305/00
See application file for complete search history.

(56) References Cited

U.S. PATENT DOCUMENTS

| | | | | |
|---|---|---|---|---|
| 4,306,059 A | * | 12/1981 | Yokobayashi | A23B 5/06 106/135.1 |
| 7,000,000 B1 | * | 2/2006 | O'Brien | C12P 19/08 536/123.12 |
| 9,080,195 B2 | * | 7/2015 | O'Brien | C12P 19/18 |
| 2014/0323715 A1 | * | 10/2014 | Kasat | C08B 37/0009 536/119 |
| 2015/0191550 A1 | * | 7/2015 | Mishra | B29C 41/12 536/123.12 |

FOREIGN PATENT DOCUMENTS

WO 2011056924 A2 5/2011

OTHER PUBLICATIONS

Swatloski, Richard P. et al., Dissolution of Cellose with Ionic Liquids, Journal of the American Chemical Society, 2002, pp. 4974-4975, vol. 124.
Simpson, Christine L. et al., Four glucosyltransferases, GtfJ, GtfK, GtfL and GtfM, from Streptococcus salivarius ATCC 25975, Microbiology, 1995, pp. 1451-1460, vol. 141.
Rogers, Robin D. et al., Dissolution of Cellulose with Ionic Liquids, Journal of the American Chemical Society, 2002, pp. 4974-4975, vol. 124.
Cai, Tao et al., Structure and Properties of Cellulose Fibers from Ionic Liquids, Journal of Applied Polymer Science, 2010, pp. 1047-1053, vol. 115.
International Search Report dated Mar. 20, 2013, International Application No. PCT/US2012/071692.

* cited by examiner

*Primary Examiner* — David M Brunsman

(57) ABSTRACT

The present invention is a solution comprising poly($\alpha(1\rightarrow3)$ glucan) and an ionic liquid. The solution can further contain a non-solvent that is water or an ionic liquid. The solution is suitable for use as a spinning solution for the preparation of fibers of poly($\alpha(1\rightarrow3)$ glucan) without the requirement of first derivatizing the poly($\alpha(1\rightarrow3)$ glucan).

9 Claims, 1 Drawing Sheet

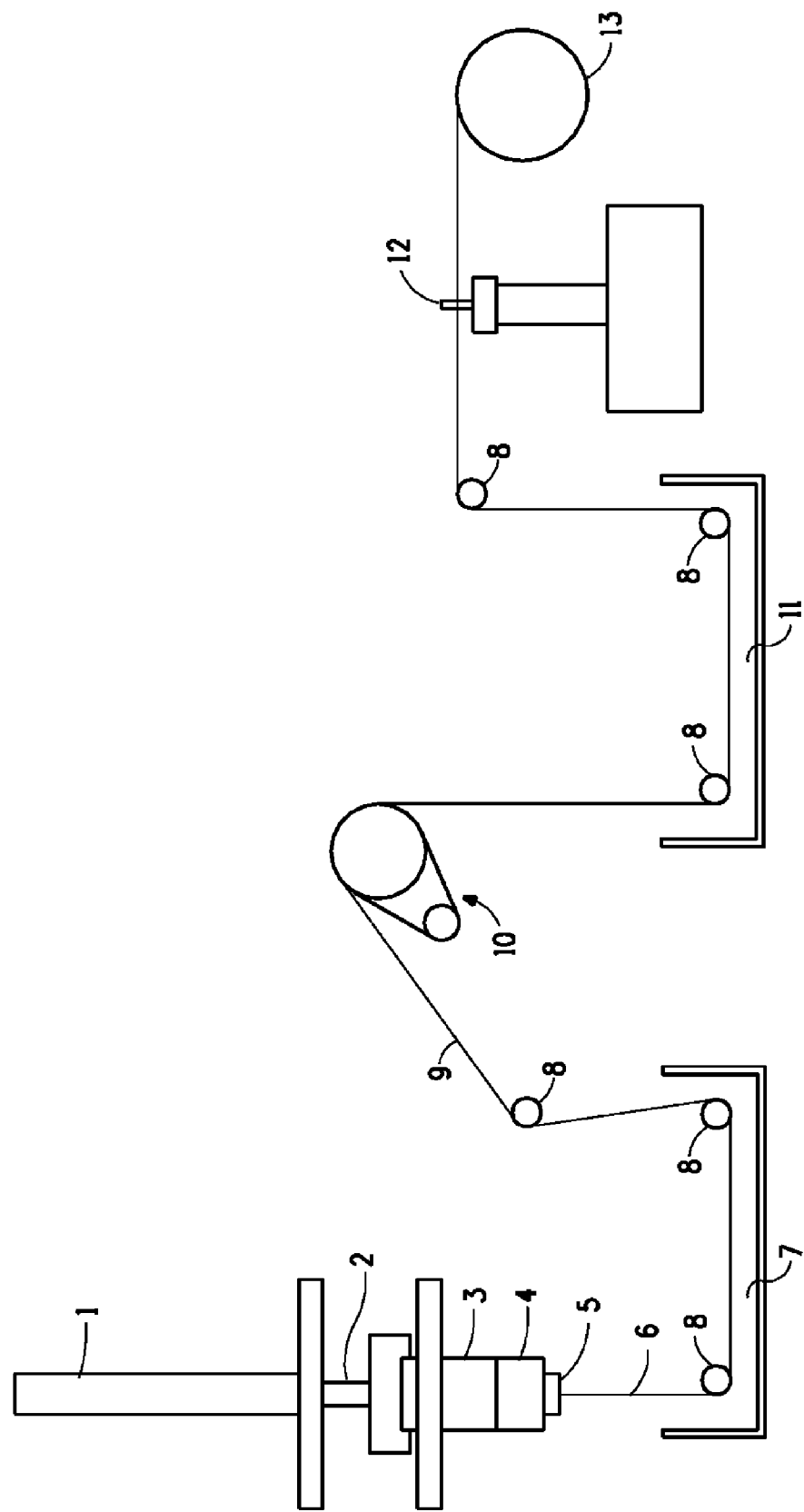

FIBER COMPOSITION COMPRISING 1,3-GLUCAN AND A METHOD OF PREPARING SAME

This application claims priority to U.S. Provisional Application Nos. 61/582,187 and 61/582,189, both of which were filed on Dec. 30, 2012, the entire contents of which are incorporated by reference herein.

BACKGROUND OF THE INVENTION

This invention relates to fibers formed from $\alpha(1\rightarrow3)$ polysaccharides, and to methods of producing said fibers. More particularly, this invention relates to fiber spinning solutions comprising $\alpha(1\rightarrow3)$ polysaccharides using ionic liquids as solvents.

Cellulose, a polysaccharide consisting of $\beta(1\rightarrow4)$-linked glucose, formed by natural processes, (Applied Fiber Science, F. Happey, Ed., Chapter 8, E. Atkins, Academic Press, New York, 1979) has become the preeminent fiber for use in manufactured textiles, films and resins. Cotton, an especially pure form of naturally occurring cellulose, is well-known for its beneficial attributes in textile applications.

Cellulosic fibers such as cotton and rayon increasingly present sustainability issues with respect to land use and environmental imprint. This may be a significant factor leading to increased level of research into textiles containing polyester fiber blends with cellulosic materials and more sustainable solutions for cellulosic-derived materials. It can be desirable to produce fibers and other cellulosic materials using other glucose-based polysaccharides—for example in films, fibers and resins that can be economically produced from renewable resources. In addition it can be desirable to produce such products using materials that are benign in the environment.

Poly ($\alpha(1\rightarrow3)$ glucan), a glucan polymer characterized by having $\alpha(1\rightarrow3)$ glycoside linkages, has been isolated by contacting an aqueous solution of sucrose with a glycosyltransferase (gtfJ) enzyme isolated from Streptococcus salivarius (Simpson et al., Microbiology, 141: 1451-1460, 1995). Poly ($\alpha(1\rightarrow3)$ glucan) refers to a polysaccharide composed of D-glucose monomers linked by glycosidic bonds. Films prepared from poly ($\alpha(1\rightarrow3)$ glucan) tolerate temperatures up to 150° C. and provide an advantage over polymers obtained from $\beta(1\rightarrow4)$ linked polysaccharides (Ogawa et al., Fiber Differentiation Methods, 47: 353-362, 1980).

U.S. Pat. No. 7,000,000 disclosed preparation of a polysaccharide fiber comprising hexose units, wherein at least 50% of the hexose units within the polymer were linked via $(\alpha(1\rightarrow3)$ glycoside linkages using the gtfJ enzyme. The gtfJ enzyme utilizes sucrose as a substrate in a polymerization reaction producing poly ($\alpha(1\rightarrow3)$ glucan) and fructose as end-products (Simpson et al., et al., Microbiology, 141: 1451-1460, 1995).

U.S. Pat. No. 7,000,000 discloses a process for preparing fiber from liquid crystalline solutions of acetylated poly($\alpha$ $(1\rightarrow3)$ glucan). Thus prepared fiber was then de-acetylated resulting in a fiber of poly($\alpha(1\rightarrow3)$ glucan).

WO2011056924 discloses the use of combinations of ionic liquids as solvents for certain polymers, including biopolymers and synthetic polymers. Ionic liquids can be desirable as solvents because of their benign environmental impact, ease of processing, cost, and other potential benefits.

Rogers, in the Journal of the American Chemical Society (J. Am. Chem. Soc., Vol. 124, 4974-4975 (2002)) and Cai in the Journal of Applied Polymer Science (Journal of Applied Polymer Science, Vol. 115, 1047-1053 (2010)) describe ionic liquid solutions of cellulose.

While poly($\alpha(1\rightarrow3)$ glucan) and cellulosic polymers are similar in many aspects, poly($\alpha(1\rightarrow3)$ glucan) does not exhibit the same solubility behavior as cellulosic polymers in ionic liquids.

It can be desirable to provide ionic liquid solutions of poly($\alpha(1\rightarrow3)$ glucan) for use in industrial processes, wherein the glucan fiber does not require a further deacylation of the fiber. Further, it can be desirable to provide solutions of poly ($\alpha(1\rightarrow3)$ glucan) using ionic liquids as solvents, but wherein the poly($\alpha(1\rightarrow3)$ glucan) can be recovered from the solution in a fiber spinning operation.

SUMMARY OF THE INVENTION

In one aspect, an embodiment of the present invention is a solution comprising poly($\alpha(1\rightarrow3)$ glucan) and an ionic liquid comprising a cation selected from the group consisting of 1-ethyl, 3-methyl imidazolium; 1-butyl, 3-methyl imidazolium, 1-hexyl, 3-methyl imidazolium, and mixtures thereof; and, a halide or carboxylate counterion. In one embodiment, the solution is isotropic.

In another aspect, an embodiment of the present invention is a process for spinning a fiber from solution of poly($\alpha(1\rightarrow3)$ glucan) in an ionic liquid, the process comprising the steps:

a) forming a mixture by combining (i) an ionic liquid comprising a cation selected from the group consisting of 1-ethyl, 3-methyl imidazolium; 1-butyl, 3-methyl imidazolium, 1-hexyl, 3-methyl imidazolium, and mixtures thereof; and, a halide or carboxylate counterion; and, (ii) poly($\alpha(1\rightarrow3)$ glucan); said solution having a solids content of 5 to 25% by weight;

b) heating said mixture under agitation to a temperature below the boiling point of the ionic liquid to obtain a glucan spinning solution;

c) causing said spinning solution to flow through a spinneret, thereby forming a fibrous strand;

d) causing said fibrous strand to contact a coagulating liquid characterized by a pH in the range of 0 to 7, thereby forming a poly($\alpha(1\rightarrow3)$ glucan) fiber.

BRIEF DESCRIPTION OF THE DRAWING

FIG. 1 is a schematic diagram of an apparatus suitable for air gap or wet spinning of liquid crystalline solutions of hexose polymer to form polysaccharide fibers.

DETAILED DESCRIPTION OF THE INVENTION

Poly($\alpha(1\rightarrow3)$ glucan) compositions of the present invention comprise poly($\alpha(1\rightarrow3)$ glucan) polymers obtained by polymerization of sucrose via the action of a glucosyltransferase enzyme, as described in U.S. Pat. No. 7,000,000, hereby incorporated by reference as if fully set forth herein.

The poly($\alpha(1\rightarrow3)$ glucan) polymers of the present invention are suitable for use as fibers, films, or resins. The poly($\alpha$ $(1\rightarrow3)$ glucan) polymers of the present invention are particularly useful as fibers. The poly($\alpha(1\rightarrow3)$ glucan) polymers used to form fibers in the present application must be dissolved in a solution in order to form a spinning dope, that is, a composition from which glucan fiber can be recovered.

For the purposes of the present invention, by "soluble" it is meant that the glucan/ionic solvent mixture does not have two or more distinct phases, and/or that there are no visible particles or agglomerates in the mixture.

The glucan polymers suitable for use as fibers of the present invention have a number average molecular weight ($M_n$) of at least 10,000 Da. It can be desirable for the polymers of the present invention to have molecular weights of 100,000 Da or more.

Properties of interest of the poly($\alpha(1\rightarrow 3)$ glucan) fibers prepared according to the present invention include but are not limited to denier, tenacity, elongation to break, and initial modulus. Suitability of the fiber for any particular application generally involves a trade-off among these, and other fiber properties. In addition, processing parameters are also part of the trade-off.

In one embodiment of the process hereof, the spinneret is a multi-hole spinneret, and a plurality of parallel filaments is produced during spinning. The filaments can be bundled after coagulation to form a multi-filament yarn.

In an alternative embodiment, the spinneret is a single hole spinneret, and a monofilament is produced. In the monofilament embodiment, fiber has a denier of at least 25. In a further embodiment, the denier is at least 50. In a still further embodiment, the denier is at least 100. In general, finer deniers are preferred.

The fibers prepared according to the process hereof are characterized by a tenacity of at least 0.25 grams per denier (gpd), preferably at least 0.50 gpd; modulus of from 30 to about 60 gpd; and, an elongation to break of from 1 to 10%.

The ionic liquids suitable for use as solvents for the poly($\alpha(1\rightarrow 3)$ glucan) polymer in the solution of the invention comprise a cation selected from the group consisting of 1-ethyl, 3-methyl imidazolium; 1-butyl, 3-methyl imidazolium, 1-hexyl, 3-methyl imidazolium, and mixtures thereof; and, a halide or carboxylate counterion. Carboxylate is preferred.

1-ethyl, 3-methyl imidazolium carboxylate is preferred. 1-ethyl, 3-methyl imidazolium acetate is most preferred.

In one embodiment, the solution hereof is isotropic.

In one embodiment, the solution hereof further comprises a non-solvent that can be present up to 50% by weight with respect to the total weight of solvent plus non-solvent. Preferably the non-solvent is present at a concentration of 10 to 30% by weight of solvent plus non-solvent.

In one embodiment, the present invention is a poly($\alpha(1\rightarrow 3)$ glucan) polymer/ionic liquid solution that is useful for spinning glucan fibers (termed herein as "glucan spinning solution"). A glucan spinning solution suitable for use in the preparation of fibers according to the present invention comprise 5 to 25 wt-% of poly($\alpha(1\rightarrow 3)$ glucan) polymer. In one embodiment, the glucan spinning solution comprises 10 to 20 wt-% of poly($\alpha(1\rightarrow 3)$ glucan) polymer. In a further embodiment, the glucan spinning solution comprises 10 to 16 wt-% poly($\alpha(1\rightarrow 3)$ glucan) polymer.

Following the practice of the art, the weight percent (wt-%) of the polymer in the solution is known as "solids content" or "% solids" which as defined and used herein is mass solute divided by mass of solution.

The poly($\alpha(1\rightarrow 3)$ glucan) polymer suitable for the present invention is not derivatized, such as to the corresponding poly($\alpha(1\rightarrow 3)$ glucan) acetate polymer, in order to form a solution and spin a fiber. While derivatization expands the scope of compositions and conditions under which fiber can be made, it also requires an additional hydrolysis step to convert the glucan derivative back to the neat poly($\alpha(1\rightarrow 3)$ glucan) polymer. In the sense of eliminating the hydrolysis step after spinning, the present invention represents an improvement over the art.

Glucan spinning solutions of the present invention are obtained by a process comprising the step of contacting the glucan polymer with the ionic liquid solvent. For the purposes of the present invention, the term "ionic liquid solvent" shall encompass mixtures of a plurality of ionic liquid solvents, or a mixture of one or more neat ionic liquid solvents with a non-solvent, so long as the resulting mixture remains a solvent for the poly($\alpha(1\rightarrow 3)$ glucan) polymer. The poly($\alpha(1\rightarrow 3)$ glucan) polymer can be added to the solvent with stirring or agitation, or alternatively the solvent can be added to the glucan with stirring or agitation. In one embodiment, the poly($\alpha(1\rightarrow 3)$ glucan) polymer is mixed into the ionic liquid solvent at ambient temperature, followed by heating under agitation to a temperature above room temperature but below the boiling point of the ionic liquid solvent. In an alternative embodiment, the components are mixed under agitation, and heated simultaneously to a temperature above room temperature but below the boiling point of the ionic liquid solvent. In yet another alternative embodiment, the ionic liquid solvent is preheated to a temperature above room temperature but below the boiling point of the ionic liquid solvent, followed by mixing in with agitation the poly($\alpha(1\rightarrow 3)$ glucan) polymer. It is preferred to mix the poly($\alpha(1\rightarrow 3)$ glucan) polymer with the ionic liquid solvent at room temperature followed by gradual heating under agitation to a temperature below the boiling point of the ionic liquid solvent. The heating rate is preferably between 1 and 2 degrees per minute. The temperature should be controlled to achieve a solution viscosity that facilitates efficient mixing.

In another aspect, the present invention is a process for spinning a glucan fiber from a glucan composition, the process comprising the steps:
  a) forming a mixture by combining (i) an ionic liquid comprising a cation selected from the group consisting of 1-ethyl, 3-methyl imidazolium; 1-butyl, 3-methyl imidazolium, 1-hexyl, 3-methyl imidazolium, and mixtures thereof; and, a halide or carboxylate counterion; and, (ii) $\alpha(1\rightarrow 3)$ glucan; said solution having a solids content of 5 to 25% by weight;
  b) heating said mixture under agitation to a temperature below the boiling point of the ionic liquid to obtain a glucan spinning solution;
  c) causing said spinning solution to flow through a spinneret, thereby forming a fibrous strand;
  d) causing said fibrous strand to contact a coagulating liquid characterized by a pH in the range of 0 to 7, thereby forming a poly($\alpha(1\rightarrow 3)$ glucan) fiber.

In one embodiment, the poly($\alpha(1\rightarrow 3)$ glucan) suitable for the fiber spinning process of the invention is characterized by $M_n$ of at least 10,000 Da. In a further embodiment, the $M_n$ is at least 100,000 Da.

In another aspect, the present invention is a process for obtaining a glucan fiber from a spinning solution described herein. The process for spinning glucan acetate fibers is described in U.S. Pat. No. 7,000,000. The process as described therein is substantially the same as that used herein, except that the glucan fibers are obtained from the spinning solution described herein.

FIG. 1 is a schematic diagram of an apparatus suitable for use in the fiber spinning process hereof. The worm gear drive, 1, drives a ram, 2, at a controlled rate onto a piston fitted into a spinning cell, 3. The spinning cell may contain filter assemblies. A suitable filter assembly includes 100 and 325 mesh stainless steel screens. A spin pack, 5, contains the spinneret and optionally stainless steel screens as prefilters for the spinneret. The extruded filament, 6, produced therefrom is optionally directed through an inert non coagulating layer (typically an air gap) and into a liquid coagulating bath, 7. The extrudate can be, but need not be, directed back and forth through the bath between guides, 8, which are normally fabricated of Teflon® PTFE. Only one pass through the bath is shown in FIG. 1. On exiting the coagulation bath, 7, the thus quenched filament, 9, can optionally be directed through a drawing zone using independently driven rolls, 10, around which the thus quenched filament is wrapped. The quenched filament may optionally be directed through a second liquid bath, 11, that allows further treatment such as additional solvent extraction, washing or drawing of the extruded filaments. The thus prepared filament is then directed through a traversing mechanism to evenly distribute the fiber on the bobbin, 12, and collected on plastic or stainless steel bobbins using a wind up, 13. In one embodiment, the process comprises a plurality of independently driven rolls.

The spinning solution can be prepared by combining the ionic liquid, non-solvent if desired, and poly($\alpha(1\rightarrow3)$ glucan) as described supra. The solids content of poly($\alpha(1\rightarrow3)$ glucan) in the solution ranges from 5 to 25% wt-% with respect to the total weight of the solution, with 5 to 20 wt-% preferred. At concentrations of glucan below 5% by weight, the viscosity of the solution is greatly reduced. Solution concentrations above 16% by weight are increasingly problematical to form. In the range of 16 to 20% by weight, increasingly refined solution forming techniques are often required. It is believed by the inventors hereof that sophisticated mixing technology will permit formation of solutions having as much as 25% solids, but solids content of that level have not been obtained in the specific embodiments infra.

In any given embodiment, the solubility limit of glucan is a function of the molecular weight, the ionic liquid solvent/non-solvent ratio, the duration of mixing, the viscosity of the solution as it is being formed, the shear forces to which the solution is subject, and the temperature at which mixing takes place. In general, lower molecular weight glucan will be more soluble than higher molecular weight, other things being equal. Generally, higher shear mixing, longer mixing time, and higher temperature will be associated with higher solubility. The maximum temperature for mixing is limited by the boiling point of the solvents. The optimum ionic liquid solvent/non-solvent ratio may change depending upon the other parameters in the mixing process.

In one embodiment of the process hereof, the spinning solution is isotropic.

The fiber prepared according to the process of the invention from the solution of the invention is useful as a sustainably sourced hygroscopic fibrous pulp or mat that can be incorporated in porous absorbent materials such as plant growth media, diapers, paper towels and the like. These fibers with finer denier and resulting higher tenacity (from fewer defects) would be useful as textile fibers.

The invention is further described in, but not limited by, the following specific embodiments thereof.

Preparation of Glucosyltransferase (qtfJ) Enzyme

Materials

Dialysis tubing (Spectrapor 25225-226, 12000 molecular weight cut-off) was obtained from VWR (Radnor, Pa.); Dextran and ethanol were obtained from Sigma Aldrich. Sucrose was obtained from VWR; Suppressor 7153 antifoam was obtained from Cognis Corporation (Cincinnati, Ohio); All other chemicals were obtained from commonly used suppliers of such chemicals.

Seed Medium

The seed medium, used to grow the starter cultures for the fermenters, contained: yeast extract (Amberx 695, 5.0 grams per liter, g/L), K2HPO4 (10.0 g/L), KH2PO4 (7.0 g/L), sodium citrate dihydrate (1.0 g/L), (NH4)2SO4 (4.0 g/L), MgSO4 heptahydrate (1.0 g/L) and ferric ammonium citrate (0.10 g/L). The pH of the medium was adjusted to 6.8 using either 5N NaOH or H2SO4 and the medium was sterilized in the flask. Post sterilization additions included glucose (20 mL/L of a 50% w/w solution) and ampicillin (4 mL/L of a 25 mg/mL stock solution).

Fermenter Medium

The growth medium used in the fermenter contained: KH2PO4 (3.50 g/L), FeSO4 heptahydrate (0.05 g/L), MgSO4 heptahydrate (2.0 g/L), sodium citrate dihydrate (1.90 g/L), yeast extract (Ambrex 695, 5.0 g/L), Suppressor 7153 antifoam (0.25 milliliters per liter, mL/L), NaCl (1.0 g/L), CaCl2 dihydrate (10 g/L), and NIT trace elements solution (10 mL/L). The NIT trace elements solution contained citric acid monohydrate (10 g/L), MnSO4 hydrate (2 g/L), NaCl (2 g/L), FeSO4 heptahydrate (0.5 g/L), ZnSO4 heptahydrate (0.2 g/L), CuSO4 pentahydrate (0.02 g/L) and NaMoO4 dihydrate (0.02 g/L). Post sterilization additions included glucose (12.5 g/L of a 50% w/w solution) and ampicillin (4 mL/L of a 25 mg/mL stock solution).

Construction of Glucosyltransferase (qtfJ) Enzyme Expression Strain

A gene encoding the mature glucosyltransferase enzyme (gtfJ; EC 2.4.1.5; GENBANK® AAA26896.1, SEQ ID NO: 3) from *Streptococcus* salivarius (ATCC 25975) was synthesized using codons optimized for expression in *E. coli* (DNA 2.0, Menlo Park Calif.). The nucleic acid product (SEQ ID NO: 1) was sub-cloned into pJexpress404® (DNA 2.0, Menlo Park Calif.) to generate the plasmid identified as pMP52 (SEQ ID NO: 2). The plasmid pMP52 was used to transform *E. coli* MG1655 (ATCC 47076™) to generate the strain identified as MG1655/pMP52. All procedures used for construction of the glucosyltransferase enzyme expression strain are well known in the art and can be performed by individuals skilled in the relevant art without undue experimentation.

Production of Recombinant gtfJ in Fermentation

Production of the recombinant gtfJ enzyme in a fermenter was initiated by preparing a pre-seed culture of the *E. coli* strain MG1655/pMP52, expressing the gtfJ enzyme, constructed as described in Example 1. A 10 mL aliquot of the seed medium was added into a 125 ml disposable baffled flask and was inoculated with a 1.0 mL culture of *E. coli* MG1655/pMP52 in 20% glycerol. This culture was allowed to grow at 37° C. while shaking at 300 revolutions per minute (rpm) for 3 hours. A seed culture, for starting the fermenter, was prepared by charging a 2 L shake flask with 0.5 L of the seed medium. 1.0 mL of the pre-seed culture was aseptically transferred into 0.5 L seed medium in the flask and cultivated at 37° C. and 300 rpm for 5 hours. The seed culture was transferred at optical density 550 nm (OD550)>2 to a 14 L fermenter (Braun, Perth Amboy, N.J.) containing 8 L of the fermenter medium described above at 37° C.

Cells of *E. coli* MG1655/pMP52 were allowed to grow in the fermenter and glucose feed (50% w/w glucose solution containing 1% w/w $MgSO_4.7H2O$) was initiated when glucose concentration in the medium decreased to 0.5 g/L. The feed was started at 0.36 grams feed per minute (g feed/min) and increased progressively each hour to 0.42, 0.49, 0.57, 0.66, 0.77, 0.90, 1.04, 1.21, 1.41 1.63, 1.92, 2.2 g feed/min respectively. The rate was held constant afterwards by decreasing or temporarily stopping the glucose feed when glucose concentration exceeded 0.1 g/L. Glucose concentration in the medium was monitored using a YSI glucose analyzer (YSI, Yellow Springs, Ohio).

Induction of glucosyltransferase enzyme activity was initiated, when cells reached an OD550 of 70, with the addition of 9 mL of 0.5 M IPTG (isopropyl β-D-1-thiogalacto-pyranoside). The dissolved oxygen (DO) concentration was controlled at 25% of air saturation. The DO was controlled first by impeller agitation rate (400 to 1200 rpm) and later by aeration rate (2 to 10 standard liters per minute, slpm). The pH was controlled at 6.8. NH4OH (14.5% weight/volume, w/v) and H2SO4 (20% w/v) were used for pH control. The back pressure was maintained at 0.5 bars. At various intervals (20, 25 and 30 hours), 5 ml of Suppressor 7153 antifoam was added into the fermenter to suppress foaming. Cells were harvested by centrifugation 8 hours post IPTG addition and were stored at −80° C. as a cell paste.

Preparation of qtfJ Crude Enzyme Extract from Cell Paste

The cell paste obtained above was suspended at 150 g/L in 50 mM potassium phosphate buffer pH 7.2 to prepare a slurry. The slurry was homogenized at 12,000 psi (Rannie-type machine, APV-1000 or APV 16.56) and the homogenate chilled to 4° C. With moderately vigorous stirring, 50 g of a floc solution (Aldrich no. 409138, 5% in 50 mM sodium phosphate buffer pH 7.0) was added per liter of cell homogenate. Agitation was reduced to light stirring for 15 minutes. The cell homogenate was then clarified by centrifugation at 4500 rpm for 3 hours at 5-10° C. Supernatant, containing crude gtfJ enzyme extract, was concentrated (approximately 5×) with a 30 kilo Dalton (kDa) cut-off membrane. The concentration of protein in the gftJ enzyme solution was determined by the bicinchoninic acid (BCA) protein assay (Sigma Aldrich) to be 4-8 g/L.

Preparation of Poly(α(1→3) Glucan)

All materials were obtained from VWR or Sigma Aldrich. In a 150 gallon glass lined reactor with stirring and temperature control approximately 394 kg of an aqueous solution was prepared by combining 75 kg sucrose (VWR #BDH8029), Dextran T-10 500 g (Sigma #D9260), 3.4 kg potassium phosphate buffer adjusted to pH 7.0 using 10 kg of 10% KOH(aq.). All of the ingredients are added in the amount listed in table 1. The solution was then charged with 32 units/liter of enzyme prepared as described herein followed by an additional 1 L of de-ionized water and mixed mildly at 25° C. for 72 hours. The resulting glucan solids was transferred to a Zwag filter with the mother liquor removed. The cake was washed via displacement with water 3 times with approximately 150 kg of water. Finally two additional displacement washes with 100 L of methanol were carried out. The material was dried under vacuum with a 60° C. jacket. Yield: 6.6 kg white flaky solids. The poly(α(1→3) glucan) polymer so prepared is herein designated polymer P1.

Solutions of Poly(α(1→3)Glucan)Polymer

Ionic liquids 1-butyl-3-methylimidazolium acetate and 1-ethyl-3-methylimidazolium acetate were obtained from BASF. Ionic liquid 1-hexyl-3-methylimidazolium chloride and 1-ethyl-3-methylimidazolium chloride were obtained from Sigma-Aldrich. Ionic liquid 1-butyl-3-methylimidazolium chloride was obtained from Fluka.

Example 1

In a glove box a 20 ml glass vial was charged with 1.99 g of 1 ethyl, 3-methyl imidazolium acetate (EMIMAc). The vial was removed from the glove box and 0.20 g of polymer P1 was added, bringing the solids level to 9.3 wt-%. The container was fitted with a cap through which a polypropylene stirring rod had been fitted through a septum. The contents were manually mixed with the plastic stirrer and placed in a ReactiTherm™ Heating and Stirring Module (Pierce, Rockford, Ill.) with an inlet of nitrogen inserted through a needle through the septum. The Reacti-Therm hereinafter shall be referred to as "the heating block." The sample was stirred at room temperature for approximately 15 minutes. The set point temperature of the heating block was then increased to 50° C. After about 60 minutes, the set-point temperature was raised to 80° C. After about an additional 60 minutes, some solubility was observed. The set-point temperature was then increased to 100° C. After an additional 120 minutes P1 was dissolved at the completion of the experiment. Upon cooling, P1 remained in solution.

Example 2

The apparatus, materials, and procedures for charging the 20 ml glass vial employed in Example 1 were repeated except that 1.96 g of EMIMAc and 0.27 g of polymer P1 were added. The solids level was 12.0 wt-%. After stirring at room temperature for approximately 15 minutes, the set-point temperature of the heating block was then increased to 50° C. After 50 minutes, an increase in viscosity was observed. The set-point temperature was then raised to 80° C. After an additional 55 minutes, some solubility was observed. The set-point temperature was then increased to 100° C. After an additional 180 minutes, polymer P1 was dissolved. Upon cooling, the P1 remained in solution.

Example 3

The apparatus, materials, and procedures for charging the 20 ml glass vial employed in Example 1 were repeated except that 2.0 g of EMIMAc and 0.35 g of polymer P1 were added. The solids level was 15.0 wt-%. After stirring at room temperature for approximately 15 minutes, the set-point temperature of the heating block was then increased to 50° C. After 50 minutes, an increase in viscosity was observed. The set-point temperature was then raised to 80° C. After an additional 55 minutes, some solubility was observed. The set-point temperature was then increased to 100° C. After an additional 230 minutes, polymer P1 was dissolved. Upon cooling, the P1 remained in solution.

Example 4

The apparatus, materials, and procedures for charging the 20 ml glass vial employed in Example 3 were repeated except that 1.79 g of EMIMAc was added. 0.27 g of polymer P1 together with 0.19 g of deionized water were added. The solids level was 12.1 wt-%. After stirring at room temperature for approximately 15 minutes, the set-point temperature of the heating block was then increased to 50° C. After 40 minutes the set-point temperature was then raised to 80° C. After an additional 50 minutes, some solubility was observed. The set-point temperature was then increased to 100° C. After an additional 70 minutes, polymer P1 was dissolved.

Example 5

The apparatus, materials, and procedures for charging the 20 ml glass vial employed in Example 3 were repeated except that 1.79 g of EMIMAc was added. 0.35 g of polymer P1 together with 0.19 g of deionized water were added. The solids level was 14.9 wt-%. After stirring at room temperature for approximately 15 minutes, the set-point temperature of the heating block was then increased to 50° C. After 40 minutes the set-point temperature was then raised to 80° C. After an additional 50 minutes, some solubility was observed.

The set-point temperature was then increased to 100° C. After an additional 70 minutes, polymer P1 was dissolved.

Example 6

The apparatus, materials, and procedures for charging the 20 ml glass vial employed in Example 3 were repeated except that 1.62 g of EMIMAc was added. 0.22 g of polymer P1 together with 0.42 g of deionized water were added. The solids level was 10.0 wt-%. After stirring at room temperature for approximately 15 minutes, the set-point temperature of the heating block was then increased to 50° C. After 40 minutes the set-point temperature was then raised to 80° C. After an additional 65 minutes, some solubility was observed. The set-point temperature was then increased to 100° C. After an additional 75 minutes, polymer P1 was dissolved.

Example 7

The apparatus, materials, and procedures for charging the 20 ml glass vial employed in Example 3 were repeated except that 1.41 g of EMIMAc was added. 0.27 g of polymer P1 together with 0.61 g of deionized water were added. The solids level was 11.9 wt-%. After stirring at room temperature for approximately 15 minutes, the set-point temperature of the heating block was then increased to 50° C. After 45 minutes an increase in viscosity was observed. The set-point temperature was then raised to 80° C. After an additional 60 minutes, some solubility was observed. The set-point temperature was then increased to 100° C. After an additional 145 minutes, polymer P1 was dissolved.

Example 8

The apparatus, materials, and procedures for charging the 20 ml glass vial employed in Example 3 were repeated except that 1.40 g of EMIMAc was added. 0.36 g of polymer P1 together with 0.59 g of deionized water were added. The solids level was 15.2 wt-%. After stirring at room temperature for approximately 15 minutes, the set-point temperature of the heating block was then increased to 50° C. After 45 minutes an increase in viscosity was observed. The set-point temperature was then raised to 80° C. After an additional 60 minutes, some solubility was observed. The set-point temperature was then increased to 100° C. After an additional 145 minutes, the mixture so prepared was cooled to room temperature and kept at room temperature for about 15 hours. The mixture was then reheated to 80° C. for 180 minutes, after which the polymer P1 was observed to have dissolved.

Example 9

The apparatus, materials, and procedures for charging the 20 ml glass vial employed in Example 3 were repeated except that 1.41 g of EMIMAc was added. 0.23 g of polymer P1 together with 0.63 g of deionized water were added. The solids level was 10.0 wt-%. After stirring at room temperature for approximately 15 minutes, the set-point temperature of the heating block was then increased to 50° C. After 50 minutes an increase in viscosity was observed. The set-point temperature was then raised to 80° C. After an additional 55 minutes, some solubility was observed. The set-point temperature was then increased to 100° C. After an additional 80 minutes, polymer P1 was dissolved.

Comparative Example A

The apparatus, materials, and procedures for charging the 20 ml glass vial employed in Example 1 were repeated except that 2.0 g of 1-butyl, 3-methyl imidazolium acetate (BMIMAc) was added instead of the EMIMAc. 0.21 g of polymer P1 was added. The solids level was 9.3 wt-%. After stirring at room temperature for approximately 15 minutes, the set-point temperature of the heating block was then increased to 50° C. After 60 minutes the set-point temperature was then raised to 80° C. After an additional 60 minutes, the set-point temperature was then increased to 100° C. After an additional 120 minutes, polymer P1 was observed to not have dissolved.

Comparative Example B

The apparatus, materials, and procedures for charging the 20 ml glass vial employed in Comparative Example A were repeated except that 2.0 g of 1-ethyl, 3-methyl imidazolium chloride (EMIMCl) was added instead of the BMIMAc. 0.22 g of polymer P1 was added. The solids level was 10.0 wt-%. After stirring at room temperature for approximately 15 minutes, the set-point temperature of the heating block was then increased to 50° C. After 40 minutes, the set-point temperature was then raised to 80° C. After an additional 50 minutes, the EMIMCl was observed to have melted. The set-point temperature was then increased to 100° C. After an additional 240 minutes, polymer P1 was observed to not have dissolved.

Example 10

The apparatus, materials, and procedures for charging the 20 ml glass vial employed in Comparative Example A were repeated except that 2.0 g of 1-butyl, 3-methyl imidazolium chloride (BMIMCl) was added instead of the BMIMAc. 0.23 g of polymer P1 was added. The solids level was 10.1 wt-%. After stirring at room temperature for approximately 3 minutes, the set-point temperature of the heating block was then increased to 50° C. After 40 minutes the set-point temperature was then raised to 80° C. After an additional 50 minutes, the set-point temperature was then increased to 100° C. After an additional 80 minutes, some increase in viscosity was observed. After 240 minutes at 100° C. polymer P1 had partially dissolved.

Example 11

The apparatus, materials, and procedures for charging the 20 ml glass vial employed in Example 1 were repeated except that 40.1 g of EMIMAc and 5.5 g of polymer P1 were added. The solids level was 12.1 wt-%. After stirring at room temperature for approximately 15 minutes, the set-point temperature of the heating block was then increased to 100° C. After 240 minutes, the heat was turned off. The resultant solution was cooled to room temperature overnight while remaining in the heating block. Particulate matter was observed in the thus cooled solution. The solution was reheated to 100° C. After 90 minutes, the polymer was observed to have dissolved. The thus formed solution was again cooled to room temperature.

Example 12

The apparatus, materials, and procedures for charging the 20 ml glass vial employed in Example 11 were repeated except that 36.05 g of EMIMAc was added. 5.44 g of polymer P1 and 4.04 g of deionized water were added to the EMIMAc. The solids level was 11.9 wt-%. After stirring at room temperature for approximately 15 minutes, the set-point temperature of the heating block was then increased to 100° C. After 240 minutes, the heat was turned off. The resultant solution was cooled to room temperature overnight while remaining in the heating block. The polymer was observed to have dissolved.

Examples 13-15

Fibers were spun from the solution prepared in Example 11, using the spinning apparatus shown in FIG. 1 with the driven roll, 10, removed from the filament pathway. The apparatus depicted in FIG. 1 was modified by removal of the driven roll, 10, and the second liquid bath, 11, from the filament pathway. Spin stretch was attained by running the windup faster than the jet velocity at the spinneret. The spin pack was provided with a filter assembly consisting of 100 and 325 mesh screens. The spinneret consisted of a single circular hole having a diameter of 0.005 in. The spinneret hole had an L/D ration of 6.000. The filament was spun directly into glacial acetic acid with the air gap shown in FIG. 1 set to a minimum. The glacial acetic acid coagulation bath was 4.4 feet in length. The coagulated fiber was directed to a speed controlled wind-up with a traversing guide, and wound on bobbins at wind-up speeds shown in Table 1. The fiber bobbins were soaked overnight in the media shown in Table 1 and then removed and allowed to air dry before the fibers were subjected to physical measurements. Table 1 gives the spinning conditions that were used for the fibers prepared in Examples 15-17. These include the pumping rate of the spinning solution to the spinneret, the jet velocity of the spinning solution exiting the spinneret hole, the length of the air gap, the temperature of the spinning solution, the wind-up speed, and the spin stretch factor (SSF) which is the ratio of the wind-up speed to the jet velocity.

Physical properties such as tenacity, elongation and initial modulus were measured using methods and instruments conforming to ASTM Standard Methods D3822 and D1577 (Option C), except that the test specimen length was 10 inches. Reported results are averages for 3 to 5 individual yarn tests.

Table 1 shows the properties of the thus prepared filaments. These include the denier of the fiber produced, and the physical properties such as tenacity (T) in grams per denier (gpd), elongation to break (E, %), and initial modulus (M) in gpd.

Example 16

Fiber was spun in the manner of Examples 13-15 but using the spinning solution of Example 12. Spinning conditions and fiber properties are shown in Table 1.

TABLE 1

|  | Example 13 | Example 14 | Example 15 | Example 16 |
|---|---|---|---|---|
| Solvent: | EMIMoAC | EMIMoAC | EMIMoAC | EMIMoAC/water (90:10 wt/wt) |
| % solids | 12 | 12 | 12 | 12 |
| Pump rate (mL/min) | 80 | 80 | 40 | 80 |
| Jet velocity (ft/min) | 20 | 20 | 10 | 20 |
| Air gap | ½" | ½" | 7/16" | ½" |
| Temp (° C.) | 24 | 24 | 23 | 24 |
| Wind up speed | 14.5 | 20.0 | 12.0 | 34 |
| S.S.F. | 0.7 | 1.0 | 1.2 | 1.7 |
| Tenacity (gpd) | 0.50 | 0.51 | 0.58 | 0.32 |

TABLE 1-continued

|  | Example 13 | Example 14 | Example 15 | Example 16 |
|---|---|---|---|---|
| Enlongation (%) | 4.3 | 2.5 | 5.1 | 2.6 |
| Modulus (gpd) | 34 | 40 | 36 | 36 |
| Denier (g) | 86 | 58 | 34 | 49 |

[1] one hole-diameter = 0.005; L/D = 6.000

Example 17

The apparatus, materials, and procedures for charging the 20 ml glass vial employed in Example 1 were repeated except that 2.74 g of 1-hexyl, 3-methyl imidazolium chloride (HMIMCl) was added instead of the BMIMAc, and 0.23 g of polymer P1 was added. The solids level was 10 wt-%. After stirring at room temperature for approximately 15 minutes, the set-point temperature of the heating block was then increased to 50° C. After 60 minutes, the set-point temperature was then raised to 80° C. After an additional 60 minutes, the set-point temperature was then increased to 100° C. After an additional 30 minutes, an increase in viscosity and some dissolution of P1 was observed. After 120 minutes at 100° C. no further dissolution appeared to have occurred.

Example 18

In a glove box a 20 ml glass vial was charged with 0.75 g of EMIMAc and 0.25 g BMIMAc then mixed by swirling the vial. Next, outside of the glove box 0.12 g of polymer P1 was added. The solids content was 11.0 wt-%. The vial was fitted with a cap through which a polypropylene stirring rod had been fitted through a septum. The contents were manually mixed with the plastic stirrer and placed in the heating block with an inlet of nitrogen inserted through a needle through the septum. The sample was stirred at room temperature for approximately 15 minutes. The temperature set-point on the heating block was then increased to 50° C. After about 60 minutes, the temperature set-point was raised to 80° C. After about 60 additional minutes, some solubility was observed. The temperature set-point was then increased to 100° C. After an additional 120 minutes the polymer was observed to have dissolved.

Example 19

The apparatus, materials, and procedures of Example 18 were replicated, except that 1.5 g of EMIMAC and 0.5 g of BMIMAc were added and mixed. 0.36 g of polymer P1 was then added. The solids content was 15.2 wt-%. After stirring for 15 minutes at room temperature, the temperature set-point of the heating block was set to 50° C. After 40 minutes, the set-point was raised to 80° C. After 55 additional minutes some solubility was observed. The set-point was then raised to 100° C. After an additional 120 minutes the polymer was observed to have dissolved.

Example 20

The apparatus, materials, and procedures of Example 1 were replicated except that 2.0 g of EMIMAc was added in place of the BMIMAc. 0.50 g of polymer P1 was added. The solids content was 20 wt-%. Partial dissolution of the polymer was observed to have occurred at the completion of the heating cycle as described in Example 1.

Comparative Example C

In a glove box a 20 ml glass vial was charged with 1.0 g of EMIMOAc and 1.0 g BMIMOAc then mixed by swirling the vial. Next outside of the glove box 0.23 g of polymer P1 was added bringing the solids level to 10 wt %. The container was fitted with a cap through which a polypropylene stirring rod had been fitted through a septum. The contents were manually mixed with the plastic stirrer and placed in a reactor block with an inlet of nitrogen inserted through a needle through the septum. The sample was stirred at room temperature for approximately 15 minutes. The temperature set-point of the heating block was then increased to 50° C. After about 60 minutes, the set-point temperature was raised to 80° C. After another approximately 60 minutes, some dissolution of the polymer was observed. The temperature was then increased to 100° C. After an additional 120 minutes the polymer remained partially dissolved.

What is claimed is:

1. A solution comprising poly($\alpha(1\rightarrow3)$ glucan) and an ionic liquid selected from the group consisting of 1-ethyl, 3-methyl imidazolium acetate; 1-butyl, 3-methyl imidazolium chloride, 1-hexyl, 3-methyl imidazolium chloride, and a mixture of 1-ethyl, 3-methyl imidazolium acetate and 1-butyl, 3-methyl imidazolium acetate.

2. The solution of claim 1 wherein the ionic liquid is 1-ethyl, 3-methyl imidazolium acetate.

3. The solution of claim 1 further comprising a concentration of non-solvent up to 30% on a weight basis of the total weight of solvent plus non-solvent.

4. The solution of claim 1 wherein the poly($\alpha(1\rightarrow3)$ glucan) is present at a solids content of from about 5 weight percent to about 20 weight-%.

5. A process for spinning a fiber from a solution of poly($\alpha(1\rightarrow3)$ glucan) in an ionic liquid, the process comprising the steps:
 a) forming a mixture by combining (i) an ionic liquid selected from the group consisting of 1-ethyl, 3-methyl imidazolium acetate; 1-butyl, 3-methyl imidazolium chloride, 1-hexyl, 3-methyl imidazolium chloride, and a mixture of 1-ethyl, 3-imidazolium acetate and 1-butyl, 3-methyl imidazolium acetate; and, (ii) poly($\alpha(1\rightarrow3)$ glucan); said solution having a solids content of 5 to 25% by weight;
 b) heating said mixture under agitation to a temperature below the boiling point of the ionic liquid to obtain a glucan spinning solution;
 c) causing said spinning solution to flow through a spinneret, thereby forming a fibrous strand;
 d) causing said fibrous strand to contact a coagulating liquid characterized by a pH in the range of 1 to 7, thereby forming a poly($\alpha(1\rightarrow3)$ glucan) fiber.

6. The process of claim 5 wherein the ionic liquid is 1-ethyl, 3-methyl imidazolium acetate.

7. The process of claim 5 wherein the solution further comprises up to 30 weight percent of a non-solvent that is water or an ionic liquid, on the basis of the total weight of solvent plus non-solvent.

8. The process of claim 5 wherein the poly($\alpha(1\rightarrow3)$ glucan) is present in the solution at a solids content of from about 5 weight percent to about 20 weight-%.

9. The process of claim 5 wherein the coagulating liquid is glacial acetic acid.

* * * * *